United States Patent [19]

Ehrlich

[11] 4,372,224
[45] Feb. 8, 1983

[54] KNOCKDOWN FURNITURE CONSTRUCTION

[75] Inventor: Richard A. Ehrlich, Culpepper, Va.

[73] Assignee: Gary J. Knostman, Fulton, Tex.; Trustee of Metro Manufacturing of Texas and Metro Retailing of Texas, Inc.

[21] Appl. No.: 119,557

[22] Filed: Feb. 7, 1980

[51] Int. Cl.³ ............................................. C08L 89/00
[52] U.S. Cl. .................................. 108/159; 108/150; 108/153; 297/DIG. 6
[58] Field of Search ............... 108/159, 158, 157, 153, 108/150, 155; 182/151, 181; 2/DIG. 6; 297/DIG. 6; 24/204; 211/191

[56] References Cited

U.S. PATENT DOCUMENTS

| | | | |
|---|---|---|---|
| 1,520,520 | 12/1924 | Tomason | 108/153 |
| 2,615,770 | 10/1952 | Curtis | 108/155 |
| 3,194,407 | 7/1965 | D'Altrui | 211/191 X |
| 3,455,589 | 7/1969 | Valiulis | 24/204 X |
| 3,533,363 | 10/1970 | Reiss | 108/153 |
| 3,658,107 | 4/1972 | Perina | 24/204 X |
| 3,929,375 | 12/1975 | Gans | 297/DIG. 6 |
| 4,271,566 | 6/1981 | Perina | 297/DIG. 6 |

FOREIGN PATENT DOCUMENTS

| | | | |
|---|---|---|---|
| 156770 | 8/1939 | Australia | 108/157 |
| 1317281 | 1/1963 | France | 108/153 |

Primary Examiner—James T. McCall
Attorney, Agent, or Firm—Pravel, Gambrell, Hewitt, Kirk & Kimball

[57] ABSTRACT

A knockdown furniture construction includes a member having recesses therein, a support structure having shoulders received in the recesses and configurations mating therewith, and separable fasteners for connecting the member with the support structure having strips of complementary gripping elements secured in the recesses of the member and on the shoulders of the support structure such that the mating configurations of the shoulders and recesses reinforces the connection of the complementary gripping elements to provide a sturdy furniture construction capable of being assembled and disassembled without tools or special hardware.

6 Claims, 5 Drawing Figures

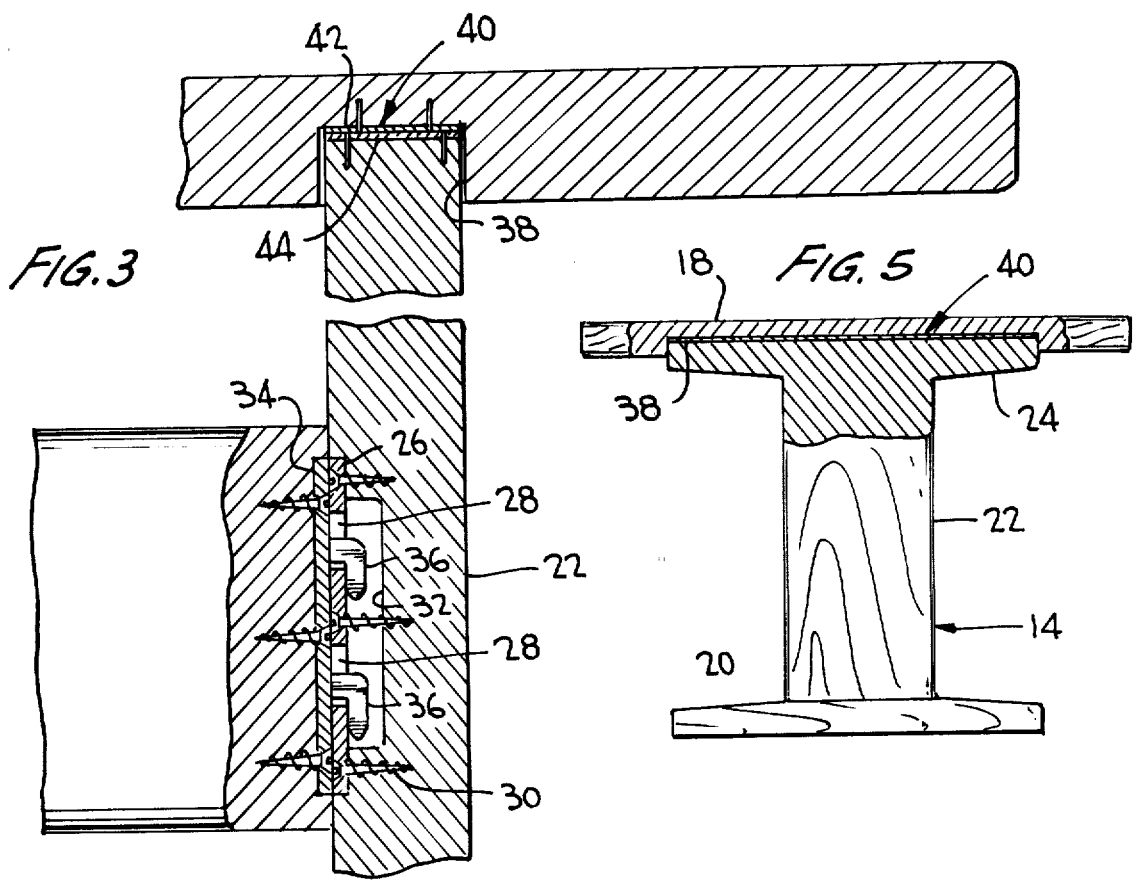
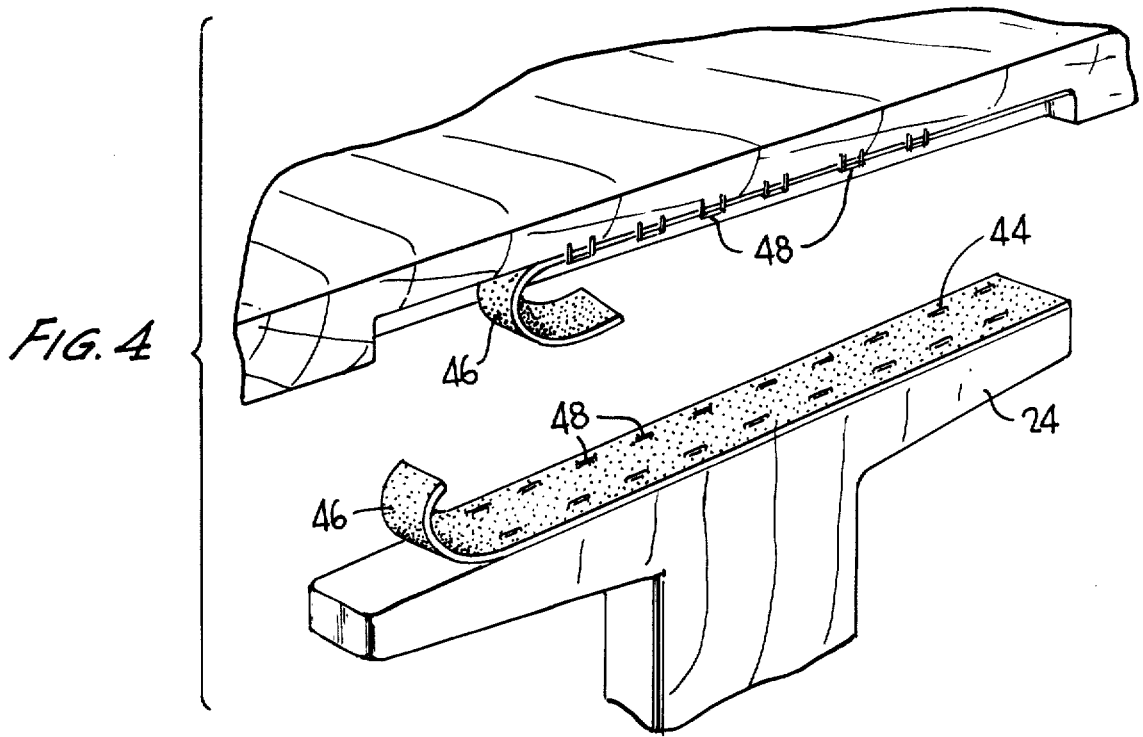

KNOCKDOWN FURNITURE CONSTRUCTION

BACKGROUND OF THE INVENTION

1. Field of the Invention

The present invention pertains to furniture constructions and, more particularly, to knockdown furniture constructions which can be easily assembled and disassembled without requiring the use of either conventional or specially designed tools or hardware.

2. Discussion of the Prior Art

There exists a great demand for knockdown furniture which can be easily assembled once it has been transported or shipped from a store or other location to an area in which the furniture is to be used and can be easily disassembled for further transportation or storage. The demand for such furniture is great because, ideally, such furniture can be packaged in containers of sufficiently small size to permit transportation in conventional automobiles of the sedan type and economical transportation via land, sea and air and can be assembled and disassembled by persons with no particular mechanical skills or experience with the construction of furniture.

In the past, attempts to manufacture easily assembled and disassembled furniture, which is commonly referred to as "knockdown" furniture, have unfortunately had the disadvantages of requiring the manipulation of specially designed connectors, necessitating the use of conventional tools such as screwdrivers and wrenches and, many times, specially designed tools, and of requiring more than minimal mechanical skills. A special problem exists with the construction of furniture having horizontal support surfaces, such as tables, desks, shelves and the like, in that such furniture is desirably heavy and sturdy to support weight without collapsing or tipping during use.

Separable fasteners composed of strips of complementary gripping elements, such as hook and loop elements, have recently been utilized in a wide variety of applications including structural installations in the nature of partitions and door catches, as exemplified by U.S. Pat. Nos. 3,455,589 to Valiulis, 3,777,435 to Perina and 3,974,548 to Meiel et al; however, such structural installations do not produce the sturdy connection required for a table or like furniture constructions in that there is no support in addition to the face to face mating of the complementary gripping surfaces. U.S. Pat. No. 3,166,031 to Lauber is exemplary of a furniture construction for attaching legs to furniture so that the furniture can be readily knocked down for shipment; however, the furniture construction of the Lauber patent has the disadvantage of not providing the required connection to prevent slipping movement of a table top while also permitting universal use on various configurations and styles of furniture.

SUMMARY OF THE INVENTION

Accordingly, it is a primary object of the present invention to overcome the above mentioned disadvantages of the prior art by utilizing separable fasteners formed of complementary gripping elements to hold a member relative to a support structure.

Another object of the present invention is to form a structural joint using separable fasteners and mating shoulders and recesses for use in easily assembled and disassembled constructions, such as furniture.

A further object of the present invention is to provide a knockdown furniture construction that can be assembled and disassembled without any tools or manipulation of specially designed hardware.

The present invention has another object in that shoulders are received in mating recesses to strengthen the connection of complementary gripping elements of separable fasteners carried by a support structure and a member of a knockdown furniture construction.

Some of the advantages of the present invention over the prior art are that no mechanical skill is required to assemble or disassemble the knockdown furniture construction, the knockdown furniture construction can be simply and inexpensively manufactured due to the use of conventional connectors and fasteners and low tolerance requirements, and all the connecting structure at all joints is hidden to provide a clean, asthetically pleasing appearance.

The present invention is generally characterized in a knockdown furniture construction including a member having a surface with a recess therein, a support structure for the member including a shoulder for insertion having a configuration mating with the configuration of the recess for positioning therein, and a separable fastener for connecting the member with the support including first and second complementary strips of gripping elements being secured to the member in the recess and the second strip of the gripping elements being secured to the support on the shoulder whereby the member can be sturdily but separably assembled with the support via engagement of the first and second strips of complementary gripping elements and the mating configurations of the shoulder and the recess.

Other objects and advantages of the present invention will become more apparent from the following description of the preferred embodiment taken in conjunction with the accompanying drawings.

BRIEF DESCRIPTION OF THE DRAWINGS

FIG. 3 is a section taken along line 3—3 of FIG. 1.

FIG. 4 is an exploded view, partly in section, of the connection of the support structure and member of the knockdown furniture construction of FIG. 1.

FIG. 5 is an end view of the knockdown furniture construction of FIG. 1 partly in section.

DESCRIPTION OF THE PREFERRED EMBODIMENT

Figure 1:
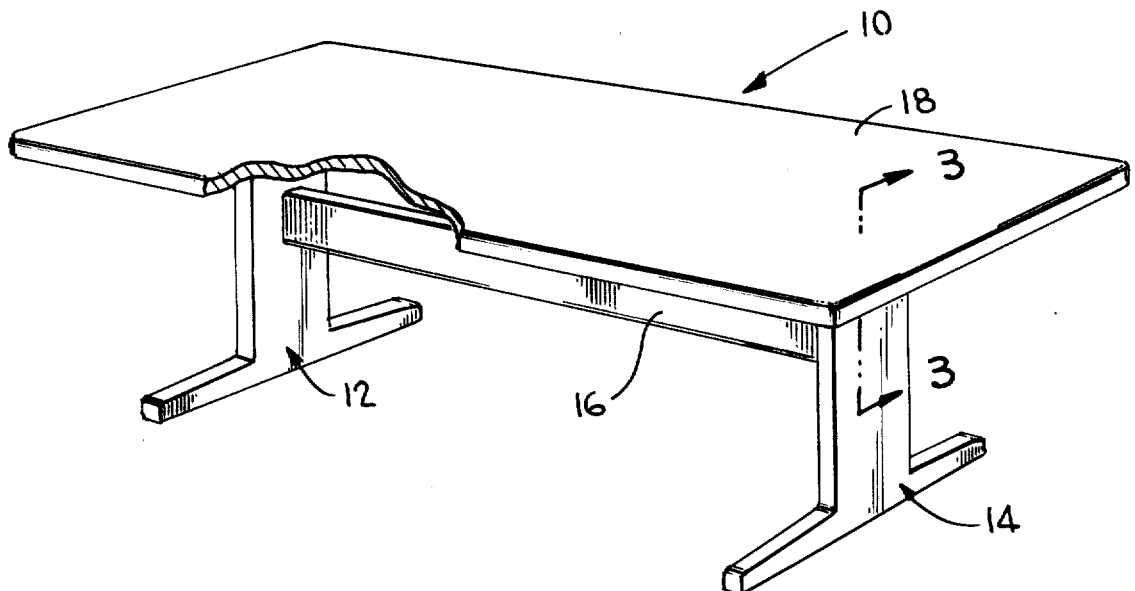
FIG. 1 is a perspective view of a knockdown furniture construction according to the present invention.

A knockdown furniture construction 10 according to the present invention is illustrated in FIG. 1 and is formed of, as basic components, a pedestal type support structure including legs 12 and 14 and a cross rail 16 interconnecting the legs, and a member 18 having a horizontal support surface, such as a table or desk top. The components of the knockdown furniture construction 10 can be constructed of any suitable material; however, the present invention is particularly advantageous for wood furniture constructions.

Figure 2:
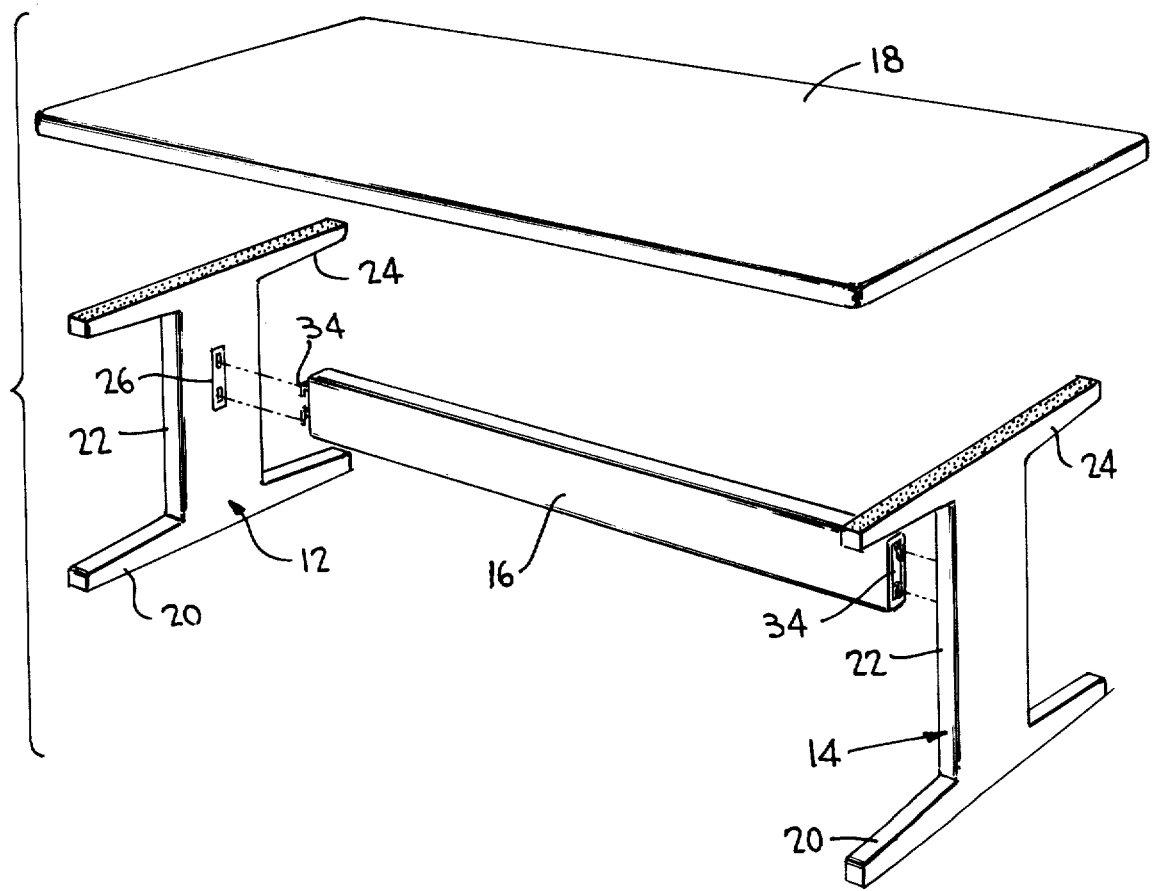
FIG. 2 is an exploded view of the knockdown furniture construction of FIG. 1.

As best illustrated in FIG. 2, the legs 12 and 14 are identical and each includes an elongate foot 20, a shank 22 extending transversely and substantially vertical therefrom and an upper shoulder 24 such that the legs 12 and 14 have an I-configuration. Within the shanks 22 are mounted female connectors 26 formed of a member having spaced apertures 28 therein, each connector 26 being secured to the shank 22 via screws 30 at a position adjacent a recess 32, as best shown in FIG. 3.

The rail 16 is essentially rectangular in cross section and carries at each end a male connector 34 having wedge-like lugs 36 extending therefrom to be received in the apertures 28 in the female connector to lock the rail 34 in place between the legs 12 and 14. Preferably, the male and female members have irregular surfaces adjacent the openings and along the inner surfaces of the wedge-like lugs to facilitate a secure connection between the connectors, as described in more detail in U.S. Pat. No. 4,165,902 to Ehrlich.

The member 18 can have any desired planar configuration and has two spaced, slot-like recesses 38 in the lower surface thereof for receiving the shoulders 24 of the legs, the recesses 38 each having a shape substantially the same as and mating with the shoulders 24 such that the shoulders can be received snugly therein. The shoulders and recesses preferably have substantially rectangular configurations with rounded corners, the recesses being only slightly larger than the shoulders to prevent movement tending to inadvertently disassemble the member and the support structure while permitting intentional disassembly thereof. The shoulders 24 are secured to the member 18 by separable fasteners 40 of the type having complementary gripping elements 42 and 44. The gripping elements 42 are in the form of strips of material adhesively secured to the upper surfaces of recess 38 and also secured thereto by means of staples 48. In a similar fashion, the complementary gripping elements 44 are in the form of strips of materials mounted on the upper surface of each shoulder 24 by means of adhesive 46 and staples 48. Any separable fasteners of the type having complementary gripping elements can be used with the present invention, it being noted that such separable fasteners are commercially available through various manufacturers including American Velcro, Inc. The gripping elements can have any suitable configurations, such as hooks and loops, and are preferably made of a resilient material, such as plastic.

In practice, the knockdown furniture construction 10 of the present invention would normally be packaged with the basic components, i.e. the legs 12 and 14, the rail 16 and the member 18, disassembled and laying flat adjacent one another to be received in an extremely small carton for packaging. When it is desired to assemble the knockdown furniture construction, the legs are held upright and the lugs on the male connectors 34 at each end of the rail 16 are simply inserted into the apertures 28 in the female connectors 26 and forced down to wedge the rail into secure connection with the legs. The member 18 is now lifted over top of the assembled pedestal support structure with the slot-like recesses 38 aligned with the shoulders 24 of the legs; and, thereafter, the member 18 is moved toward the legs such that the shoulders are received within the recesses. With slight pressure, the complementary gripping elements of the separable fasteners 40 will securely bind with one another to hold the support member 18 firmly on the pedestal support structure with the strength of the connection being greatly increased due to the shoulders 24 being received in the mating recesses 38. Due to the insertion of the shoulders within the recesses, forces applied to the edges of the member 18 will not dislodge the member from the support structure; and, additionally, the knockdown furniture construction 10 can be subjected to rough handling, such as sliding, lifting and the like, without the member becoming inadvertently disassembled from the support structure or moving in any fashion.

It will be appreciated from the above that the structural joint formed by the separable fastener and the mating shoulders and recesses according to the present invention is extremely strong and reliable to permit the sturdy assembly of furniture or other constructions without requiring any special skills, tools or hardware. The insertion of the shoulders in the mating recesses prevents any inadvertent relative movement between the complementary gripping elements tending to disengage the same; and, therefore, the structural joint will remain secure under most conditions, it being appreciated that intentional disassembly can be effected by firmly holding the support structure in place while pulling one edge of the member 18 away therefrom to disengage the complementary gripping elements with a stripping action.

The structural joint of the present invention can be used in any structural configuration; and, accordingly, the support structure can be oriented in any desired direction as can be the member 18, that is either horizontal, vertical or at an angle therebetween. Similarly, the shape and design of the support structure and the member can be varied as desired.

Inasmuchas the present invention is subject to many variations, modifications and changes in detail, it is intended that all subject matter discussed above or shown in the accompanying drawings be interpreted as illustrative and not in a limiting sense.

What is claimed is:

1. A knockdown furniture construction comprising:
   a member having a generally rectangular configuration said member having a lower surface with a longitudinal recess formed at each end therof;
   a pair of spaced apart generally I-shaped legs for supporting said member, each of said legs including an upper shoulder having a configuration mating with the configuration of said longitudinal recess at each end of said member for receivably mounting said upper shoulder therein; and,
   separable fastener means for connecting said member with said legs including first and second complementary strips of gripping elements, said first strip of gripping elements being secured to said member within said longitudinal recess at a base thereof and said second strip of gripping elements being secured to said legs on an upper surface of said upper shoulder whereby said member can be sturdily but separably assembled with said legs when said second strip of gripping elements is in full face contact with said second strip of complementary gripping elements upon mating engagement of said upper shoulder with said longitudinal recess.

2. A knockdown furniture construction as recited in claim 1 wherein said upper shoulder and said longitudinal recess have substantially rectangular configurations.

3. a knockdown furniture construction as recited in claim 1, wherein:
   said member has a horizontal support surface;
   said legs extend transverse to said support surface; and,
   a cross rail extending transversely between and secured to said legs.

4. A knockdown furniture construction as recited in claim 3 wherein:

said legs are formed having female connectors having spaced apertures therein; and, said cross rail has a male connector at each end thereof, said male connectors having wedge-like lugs extending therefrom to be received in said spaced apertures in said female connectors to lock said cross rail in place between said legs.

5. A knockdown furniture construction as recited in claim 1 wherein:

said first and second strips of complimentary gripping elements are secured in said longitudinal recesses of said member and said upper shoulders of said legs by an adhesive.

6. A knockdown furniture construction as recited in claim 5 and further including:

staples securing said first and second strips of complementary gripping elements to said longitudinal recesses of said member and said upper shoulders of said legs.

* * * * *